(12) United States Patent
Van Blokland

(10) Patent No.: US 10,575,530 B2
(45) Date of Patent: Mar. 3, 2020

(54) DOUGH LINE

(71) Applicant: Radie B.V., BC Culemborg (NL)

(72) Inventor: Johannes Josephus Antonius Van Blokland, BG Laren (NL)

(73) Assignee: Radie B.V. (NL)

( * ) Notice: Subject to any disclaimer, the term of this patent is extended or adjusted under 35 U.S.C. 154(b) by 222 days.

(21) Appl. No.: 15/895,914

(22) Filed: Feb. 13, 2018

(65) Prior Publication Data

US 2018/0235241 A1     Aug. 23, 2018

(30) Foreign Application Priority Data

Feb. 21, 2017  (EP) ..................................... 17157196

(51) Int. Cl.
| | |
|---|---|
| *A21C 3/02* | (2006.01) |
| *A21C 9/08* | (2006.01) |
| *A21D 8/02* | (2006.01) |

(52) U.S. Cl.
CPC .................. *A21C 3/02* (2013.01); *A21C 9/08* (2013.01); *A21D 8/02* (2013.01)

(58) Field of Classification Search
CPC ................ A21C 3/02; A21C 9/08; A21D 8/02
See application file for complete search history.

(56) References Cited

U.S. PATENT DOCUMENTS

| | | | |
|---|---|---|---|
| 3,476,058 A | 11/1969 | Watkin et al. | |
| 4,849,234 A | 7/1989 | Spinelli et al. | |
| 5,106,636 A | 4/1992 | Ban et al. | |
| 5,209,939 A | 5/1993 | Kempf | |

OTHER PUBLICATIONS

European Search Report dated Oct. 13, 2017 in European Application No. EP17157196.

*Primary Examiner* — James Sanders
(74) *Attorney, Agent, or Firm* — Katten Muchin Rosenman LLP

(57) ABSTRACT

Dough line for processing a dough sheet, comprising a plurality of subsequent dough processing devices, each for performing a dough processing step on the dough sheet; the dough processing step changing at least one physical property of the dough sheet, one or more conveyors for transporting the dough sheet along each of the subsequently dough processing devices, each with a predetermined speed, at least one device for measuring said physical dough sheet property at said position, a processing device, comprising a register, comprising records corresponding with multiple predetermined positions along the dough line wherein the processing device is configured for recording at least one physical dough sheet property in a record for a first predetermined position and calculating physical dough sheet properties for further predetermined positions, based on expected speeds of the one or more conveyors or dough processing devices.

11 Claims, 2 Drawing Sheets

DOUGH LINE

FIELD

The present invention relates to a dough line, in particular a dough line for processing a dough sheet, and more in particular a continuous or in other words endless dough sheet.

BACKGROUND

In automated dough processing, sheeting is a well known technique wherein dough is continuously formed out of its ingredients, and also continuously processed to the final products that are to be obtained. One of the advantages of the technique is that optimised use can be made of production facilities and space.

A dough line can be used for one specific product or dough type, and while the production of said product type is still going on, production of another product or dough type can be started. However, with the dough lines according to the state of the art, such process may be rather difficult to control. In practice, when a setting is changed at the beginning of the dough line, a controller may have to follow the dough throughout the dough line to adapt settings of dough processing devices once the dough arrives at such specific dough processing device.

SUMMARY

It is a goal of the present invention to provide a dough line that takes away the above disadvantage, or at least provides a useful alternative to the prior art.

The invention thereto proposes a dough line for processing a dough sheet, comprising a plurality of subsequent dough processing devices, each for performing a dough processing step on the dough sheet; the dough processing step changing at least one physical property, such as a width, a position or a thickness, of the dough sheet, one or more conveyors for transporting the dough sheet along each of the subsequent dough processing devices, at least one measurement device, arranged at a position along the one or more conveyors, for determining directly or indirectly said physical dough sheet property at said position, a processing device, comprising a register, comprising records corresponding with multiple predetermined positions along the dough line and along dough processing devices wherein the processing device is configured for recording at least one physical dough sheet property in a record for a first predetermined position and calculating, after conveyance of the dough sheet along a predetermined distance or during a predetermined time period, physical dough sheet properties for further predetermined positions, based on expected speeds of the one or more conveyors and expected changes of the at least one physical property of the dough sheet by the subsequent dough processing devices. Determining directly or indirectly means that determination may take place by measuring actual dough sheet properties or by reading out a machine setting.

BRIEF DESCRIPTION OF THE DRAWINGS

The invention will now be elucidated into more detail with reference to the following figures, wherein.

DETAILED DESCRIPTION

Figure 1:
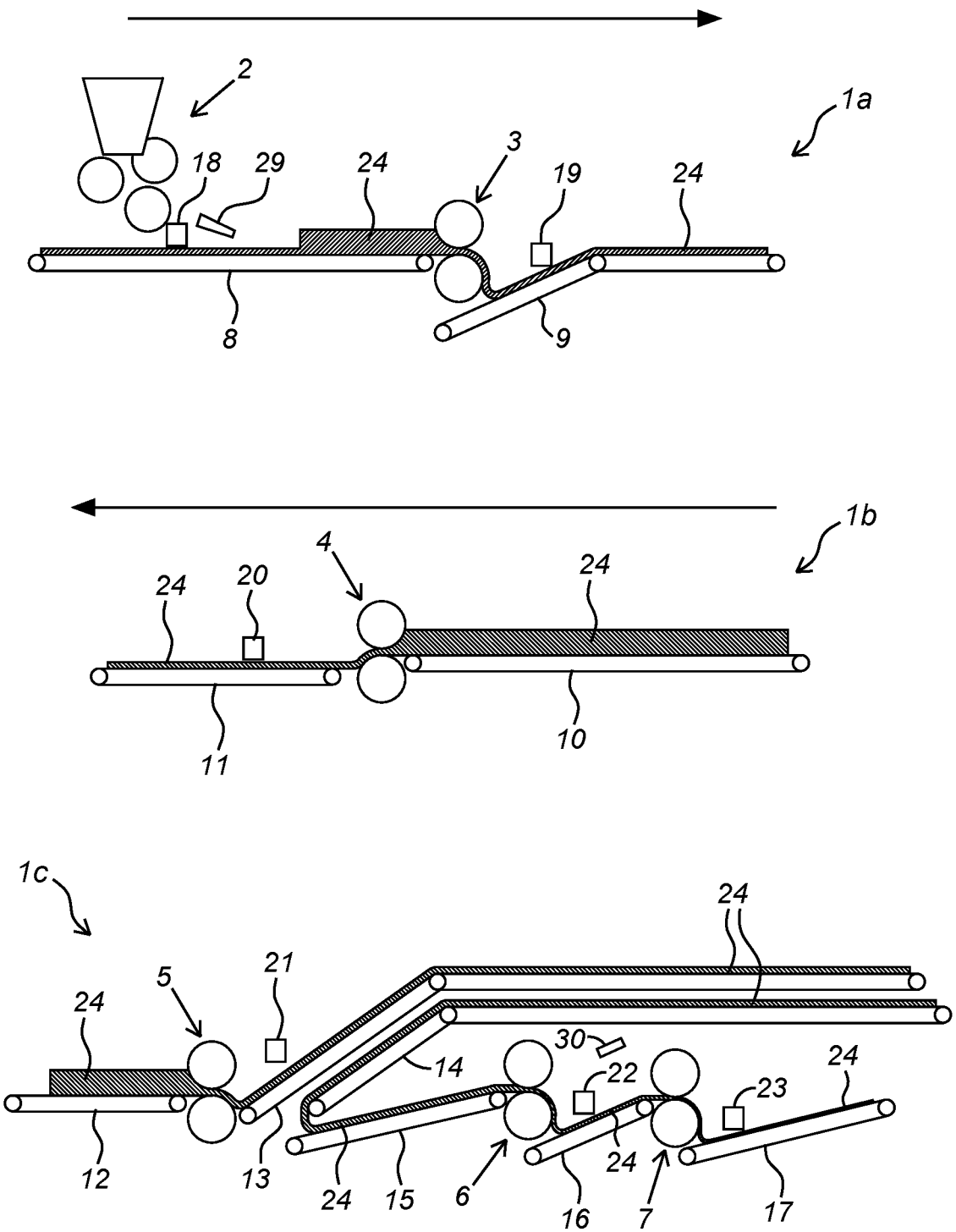
FIG. 1 is a schematic view of a dough line according to the present invention.

Subsequent dough processing devices are to be understood here as devices that perform subsequent dough processing steps on the dough sheet. This may be subsequent in time, but also in a dough processing direction, that means that a subsequent dough processing device is arranged downstream in the direction of dough conveyance.

The dough processing device for changing a physical property, such as a width, a position or a thickness, of the dough sheet may be a reductor, a roller, a laminator, an outlining device, a dough folding system, a width adjusting system, or any similar dough treating device. There may be one conveyor that leads the dough along all processing devices, or multiple conveyors for transporting the dough sheet along each of the subsequent dough processing devices.

The measurement device may comprise or consist of a sensor or means for reading out a dough processing device or conveyor setting, which may be integrated in one of the dough processing devices, or arranged at a position along the one or more conveyors, for measuring said physical dough sheet property at said position, and therefor for instance be positioned on a bridge above the conveyor. Sensors may be contact or contactless sensors, such as light sensitive and in particular infra-red sensors.

The processing device may be a digital controller such as a plc, a processor, or for instance be formed by a computer or part thereof, and comprising a register, comprising records corresponding with multiple predetermined positions along the dough line. Such register may be formed by a table in computer memory. Recording at least one physical dough sheet property in a record for a first predetermined position may be done based on the physical dough property measured by the measuring device. The measuring device may comprise photo diodes, photo cells or an ultrasone sensor, arranged above or below a conveyor. The calculation after conveyance of the dough sheet along a predetermined distance or during a predetermined time period of physical dough sheet properties for further predetermined positions may in particular be positions downstream of the first predetermined position, but calculation of upstream physical dough sheet properties is also possible.

The expected speeds of the one or more conveyors are used to calculate where the part of the dough sheet that was at the first position has arrived after a predetermined time period and expected changes of the at least one physical property of the dough sheet by the subsequent dough processing devices may for instance be an increased width after a dough rolling device.

Additionally or as an alternative, a speed setpoint of a conveyor may be used.

In an embodiment, the dough line may comprise multiple measurement devices, arranged at different positions along the one or more conveyors, for measuring said physical dough sheet property at said positions, wherein the processing device is configured for updating the calculated physical dough sheet properties in the register based on the measured physical dough sheet properties at said positions. This way, a calculated value that does not appear to match the actual value, can be replaced, and from that position on, calculations can be based on the updated physical dough sheet property.

The register may be a shift register, and wherein the physical dough sheet properties are shifted with respect to the predetermined positions, after a predetermined time period or after the dough sheet is conveyed along a predetermined distance. The shift register may be a physical shift register, but preferably be implemented in software.

The dough line may further be configured for tracking a position on the dough sheet on its way through the dough line, based on the predetermined positions and expected speeds of the one or more conveyors, and/or measured dough sheet properties. Tracking of a specific position may be beneficial when the dough line is continuously used, for different dough products that follow each other directly. Machine settings of dough processing devices may need to be adjusted upon arrival of the position of the dough sheet that corresponds to the beginning of the new product. Dough sheet properties or a dough batch number may also be sent along with the position.

The amount of change of a physical property, such as a width or a thickness, of the dough sheet by a dough processing device may be dependent on a controllable setting of the dough processing device. This enables the processing device to be configured for changing a controllable setting of a dough processing device when the position on the dough sheet has reached the dough processing device.

The processing device may further be configured for taking further parameters, such as dough properties like relaxing, rising in time or recovery after a processing step into account. The processing device may therefore be coupled with additional measurement devices, that measure ambient parameters, like temperature and humidity. Additionally, the system according to the invention may be configured for adjusting the speed of the one or more conveyors, dependent on measured physical dough sheet properties. In particular, the processing devices and one or more conveyors may be controlled based on comparison of the measured and desired physical dough sheet properties at the predetermined positions.

FIG. 1 shows a schematic representation of a dough line 1a, 1b, 1c according to the present invention. The dough line comprises a plurality of subsequent dough processing devices 2-7, each for performing a dough processing step on the dough sheet 24; the dough processing step changing at least one physical property, such as a width, a position or a thickness, of the dough sheet 24, and conveyors 8-17 for transporting the dough sheet along each of the subsequently dough processing devices. The dough line further comprises multiple measurement devices or devices for reading out machine settings 18-23, arranged at predetermined positions along the conveyors 8-17, for measuring said physical dough sheet property at said position.

The dough line further comprises a butter suspender 29, a cross roller 30 or a processing device (not depicted) comprising a register, comprising records corresponding with multiple predetermined positions along the dough line wherein the processing device is configured for recording at least one physical dough sheet property in a record for a first predetermined position; and calculating, after conveyance of the dough sheet along a predetermined distance or during a predetermined time period, physical dough sheet properties for further predetermined positions, based on expected or measured speeds of the one or more conveyors 8-17 or of the processing units; and expected changes of the at least one physical property of the dough sheet 24 by the subsequent dough processing devices 2-7.

Figure 2:
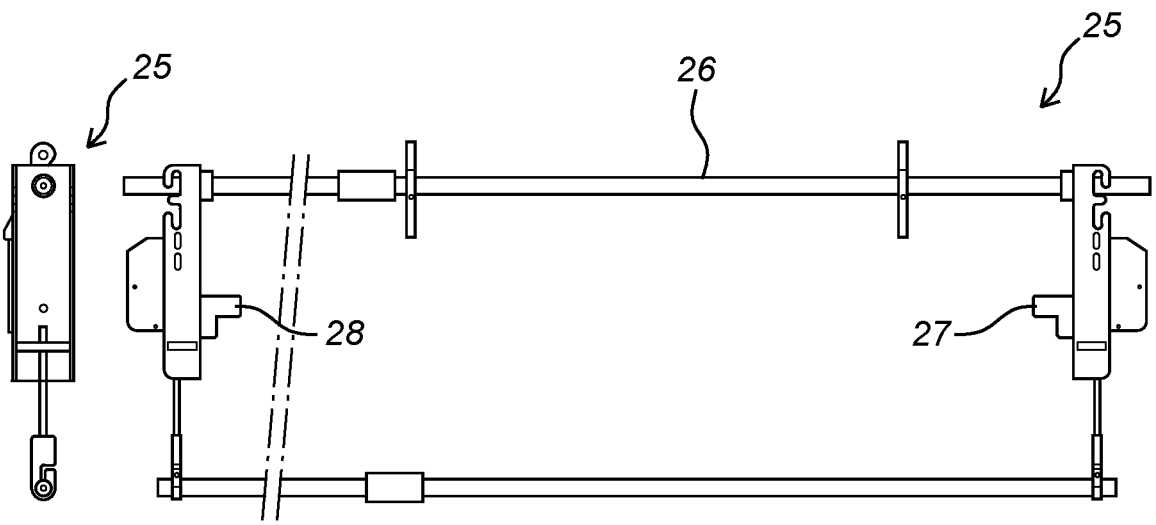
FIG. 2 is a perspective view of a sensor arrangement for use in a dough line according to the invention.
Figure 2:
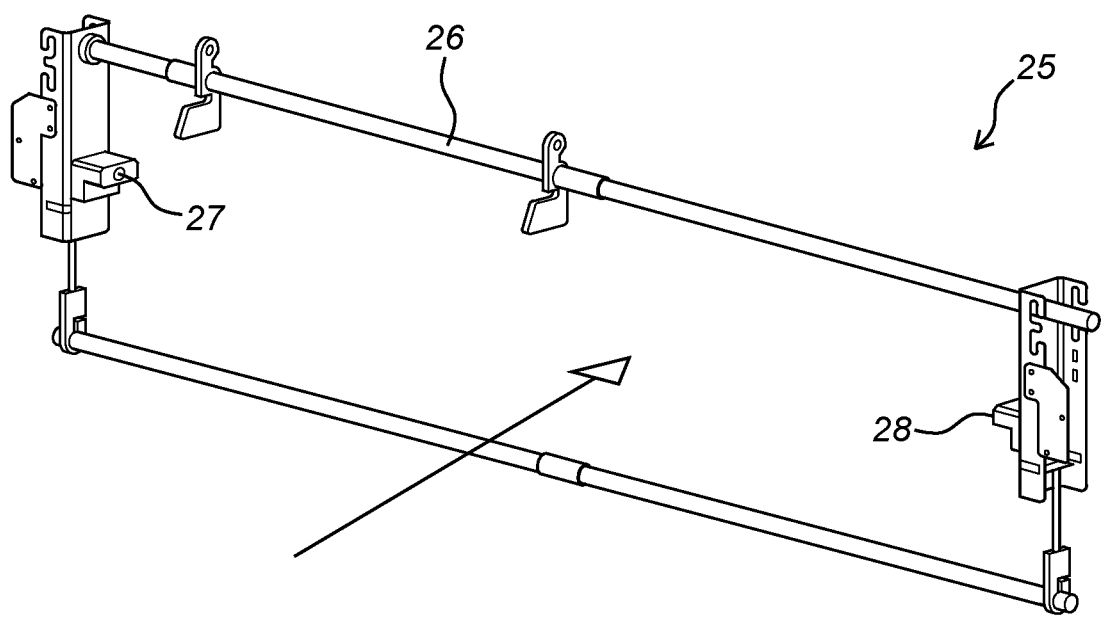

FIG. 2 shows a measurement device 25, for use in a dough line according to the present invention depicted in FIG. 1. The sensor comprises a bridge construction 26, and carries sensors 27 and 28, which may be infra-red sensors, for measuring a dough width and/or position. Thereto, the measurement device may be arranged along a dough line, such that a dough sheet is transported underneath the bridge 26.

The above described embodiments are exemplary only and do not limit the scope of protection of the present invention, as defined in the following claims.

The invention claimed is:

1. A dough line for processing a dough sheet, comprising:
a plurality of subsequent dough processing devices, each subsequent dough processing device configured to:
perform a dough processing step on the dough sheet, the dough processing step changing at least one physical property of the dough sheet;
one or more conveyors configured to transport the dough sheet along each of the subsequent dough processing devices, each of the one or more conveyors configured to transport the dough sheet with a predetermined speed;
at least one measurement device, arranged at a predetermined position along the one or more conveyors, to measure said physical dough sheet property at said predetermined position; and
a processing device, comprising:
a register, comprising records corresponding with multiple predetermined positions along the dough line and along the subsequent dough processing devices;
wherein the processing device is configured to:
a) record at least one physical dough sheet property in a record for a first predetermined position; and
b) calculate, after conveyance of the dough sheet along a predetermined distance or during a predetermined time period, physical dough sheet properties for further predetermined positions, based on
expected speeds of the one or more conveyors or settings of the subsequent dough processing devices; and
expected changes of the at least one physical property of the dough sheet by the subsequent dough processing devices,
wherein the processing device is configured to track a position on the dough sheet on its way through the dough line, based on the predetermined positions and expected speeds of the one or more conveyors, settings of the subsequent dough processing devices, and/or measured dough sheet properties,
wherein an amount of change of the at least one physical property of the dough sheet by the subsequent dough processing device or by the conveyor is dependent on a controllable setting of the subsequent dough processing device, and
wherein the subsequent processing device is configured to change a controllable setting of a dough processing device when the position on the dough sheet has reached the subsequent dough processing device.

2. The dough line according to claim 1, comprising multiple measurement devices, arranged at different positions along the one or more conveyors, for measuring said physical dough sheet property at said different positions, wherein the processing device is configured to update the calculated physical dough sheet properties in the register based on the measured physical dough sheet properties at said positions.

3. The dough line according to claim 1, wherein the register is a shift register, and wherein the physical dough sheet properties are shifted with respect to the predetermined positions, after a predetermined time period or after the dough sheet is conveyed along a predetermined distance.

4. The dough line according to claim 1, wherein the processing device is configured to take into account further parameters for dough properties including relaxing or rising in time, when calculating physical dough sheet properties.

5. The dough line according to claim 1, wherein the at least one measuring device is selected from a group consisting of photo diodes, photo cells and an ultrasone sensor, arranged above or below the one or more conveyors.

6. The dough line according to claim 1, wherein the at least one measuring device is a sensor that is arranged on a bridge above the one or more conveyors.

7. The dough line according to claim 1 wherein the at least one measuring device comprises a weighing stage.

8. The dough line according to claim 1, wherein the processing device is configured to adjust the speed of the one or more conveyors or the setting of a subsequent dough processing device, dependent on measured physical dough sheet properties or a value from the shift register.

9. The dough line according to claim 8, wherein the subsequent dough processing devices and one or more conveyors are controlled based on comparison of the measured and desired physical dough sheet properties at the predetermined positions.

10. The dough line according to claim 2, wherein the register is a shift register, and wherein the physical dough sheet properties are shifted with respect to the predetermined positions, after a predetermined time period or after the dough sheet is conveyed along a predetermined distance.

11. The dough line according to claim 1 wherein each of the plurality of subsequent dough processing devices is selected from a group consisting of a reductor, a roller, a laminator, an outlining device, a dough folding system, and a width adjusting system.

\* \* \* \* \*